F. A. STEVENS.
LENS MOUNTING.
APPLICATION FILED APR. 11, 1916.

1,195,622.                                     Patented Aug. 22, 1916.

Inventor.
Frederick A. Stevens
By Horatio E. Bellows
Attorney

UNITED STATES PATENT OFFICE.

FREDERICK A. STEVENS, OF PROVIDENCE, RHODE ISLAND, ASSIGNOR TO STEVENS AND COMPANY, INCORPORATED, A CORPORATION OF RHODE ISLAND.

LENS-MOUNTING.

1,195,622.  Specification of Letters Patent.  Patented Aug. 22, 1916.

Application filed April 11, 1916.  Serial No. 90,366.

*To all whom it may concern:*

Be it known that I, FREDERICK A. STEVENS, a citizen of the United States, residing at Providence, in the county of Providence and State of Rhode Island, have invented certain new and useful Improvements in Lens-Mountings, of which the following is a specification.

My invention relates to lens mountings, and more particularly to the members connecting a spectacle or eyeglass lens either to the temple end piece or to the stud which carries the spring, bridge, or guard.

The essential objects of my invention are to prevent a play of the lens relatively to the mounting; to accommodate the mounting to use with lenses of different thickness, and to lenses wherein the lens perforations differ in distance from the end of the lenses; to insure that the lens pin have a cement covering at all points adjacent the lens material, and that the metal members adjacent the lens faces be provided with cement; to prevent loosening or turning of the metal parts; and to provide a strong structure.

To the above ends essentially my invention consists in such parts and combinations of parts as fall within the scope of the appended claims.

Figure 1:
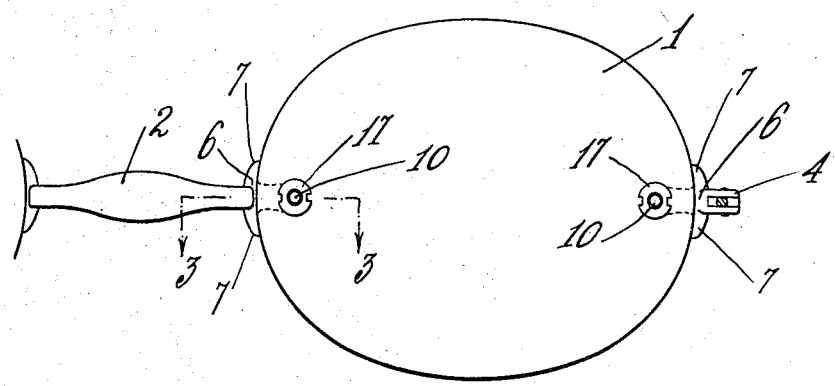
Figure 2:
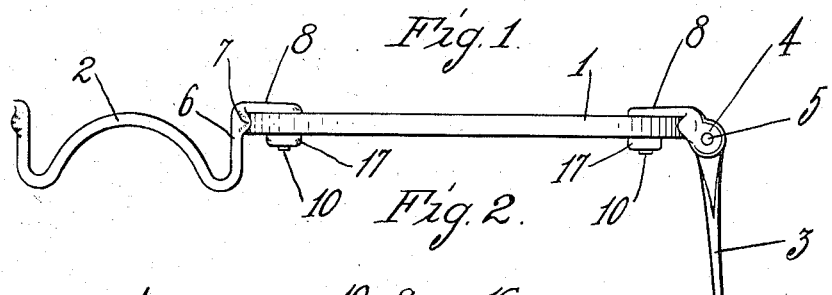
Figure 3:
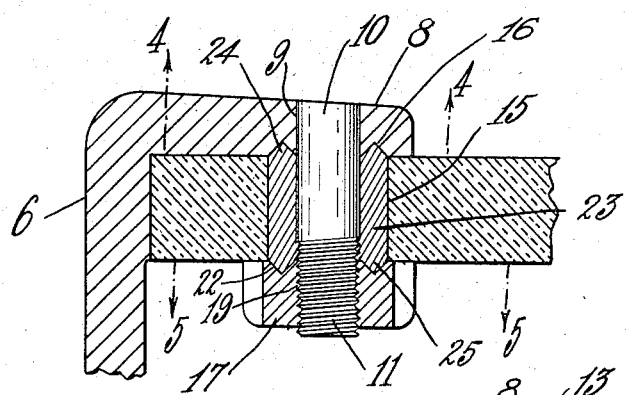
Figure 4:
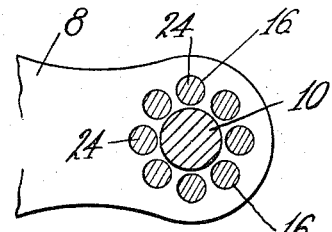
Figures 5, 6:
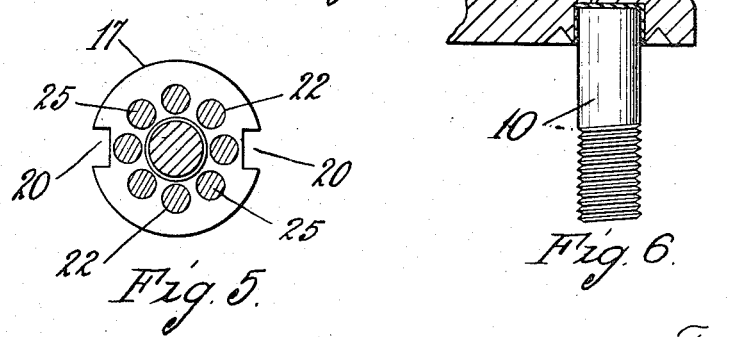
Figure 7:
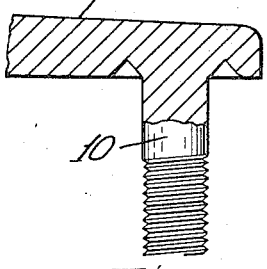

In the accompanying drawings which form a part of this specification, Figure 1 is a front elevation of a lens and its adjacent parts provided with my novel mountings, Fig. 2, a plan of the same, Fig. 3, a section on line 3—3 of Fig. 1, Figs. 4 and 5, partial sections on lines 4—4 and 5—5 respectively of Fig. 3, and Figs. 6 and 7 side elevations partially in section of modified forms of post connections.

Like reference characters indicate like parts throughout the views.

1 represents the lens, 2 an ordinary spectacle bridge, 3 a portion of an ordinary spectacle temple attached to the end piece 4, and 5 the pivot pin for the temple, all of the usual construction. The lens mounting upon the end of the end piece 4 is identical with that upon the end of the bridge 3, and a description of one will serve for both.

Integral with both the bridge 2 and end piece 4 is a lens bearing or clamp comprising a curved body 6 and arm 7. Integral with one side of the body is a strap 8 in an opening 9 of which is swaged or otherwise fixed a post 10, provided with a thread 11 upon its outer end.

In Fig. 6 is shown an alternative method of fixing the post which consists of forming a cavity 13 in the strap, and applying solder 14 at its end within the cavity.

In Fig. 7 a modification is shown wherein the post is integral with the strap. It is preferable in any instance that the post be rigid with the strap. The lens is provided near its end with a perforation or hole 15 of a diameter in excess of the diameter of the post. Circularly disposed around the opening 9 in the face of the strap are conical cavities 16. A nut 17 is provided having its central opening provided with a thread 19 engaging the thread 11 of the post which projects beyond the lens. The thread 11 preferably extends within the area of the lens. In the present instance the nut is round and is provided with marginal slots 20 to receive a turning tool. A circularly arranged series of conical cavities 22 are located on the inner face of the nut.

The space in the opening 15 around the post and the cavities in the strap and nut are filled with plastic cement and by turning the nut 17 tightly down upon the lens the latter is clamped tightly against the strap, while the curved ends of the lens abut against the lens bearings which including the arms 7 serve to assist in maintaining the lens immovable after the cement has set.

The sleeve of cement 23 around the post after hardening coöperates with the cement projections thereon 24 formed in the cavities 16, and with the cement projections 25 formed in the cavities 22 to form means for still further preventing an axial movement of any of the engaged parts.

In practice the perforations 15 of the lenses are not always at uniform distances from the edge of the lens, hence it is necessary that the diameter of this perforation be ample, but the initial plastic character of the cement overcomes this difficulty, since it is not essential that the post be concentric with the perforation, but merely that the space be filled by the cement sleeve.

The threaded portion of the post which extends within the area of the lens increases the adhesion of the hardened sleeve 23 to the post.

I claim:

1. In eyeglasses or spectacles, the combination of a lens provided with a perforation, a bearing abutting against the edge of the lens, a strap on the bearing resting against a face of the lens, a post on the strap extending through the perforation, a cement sleeve in the perforation surrounding the post, and a nut on the post adapted to bear against the second face of the lens, said sleeve being stationary relative to the lens and nut.

2. In eyeglasses or spectacles, the combination of a lens provided with a perforation, a bearing abutting against the edge of the lens, a strap on the bearing resting against the face of the lens, a post on the strap passing through the perforation and provided with a threaded portion, a cement sleeve in the perforation surrounding the post, and a nut engaging the threaded portion of the post adapted to bear against the second face of the lens, said sleeve being stationary with relation to said lens and nut.

3. In eyeglasses or spectacles, the combination of a lens provided with a perforation, a bearing abutting against the edge of the lens, a strap on the bearing resting against the face of the lens and provided with cavities, a post on the strap traversing the perforation and provided with a threaded portion, a nut engaging the threaded portion of the post and bearing against the second face of the lens, and cement in the perforation surrounding the post and in the cavities of the strap and held stationary relative to the nut.

4. In eyeglasses or spectacles, the combination of a lens provided with a perforation, a bearing abutting against the edge of the lens, a strap on the bearing resting against the face of the lens, a post on the strap traversing the perforation and provided with a threaded portion, a nut engaging the threaded portion of the post bearing against the lens and provided with cavities in its bearing face, and cement in the perforation surrounding the post and in the cavities of the nut.

5. In eyeglasses or spectacles, the combination of a lens provided with a perforation, a bearing abutting against the edge of the lens, a strap on the bearing resting against the face of the lens and provided with cavities, a post on the strap traversing the perforation and provided with a threaded portion, a nut engaging the threaded portion of the post and bearing against the second face of the lens and provided with cavities in its bearing face, and cement in the perforation surrounding the post and in the cavities of the strap and of the nut.

6. In eyeglasses or spectacles, the combination of a lens provided with a perforation, a bearing abutting against the edge of the lens, a strap on the bearing resting against the face of the lens and provided with a circular series of cavities in its bearing face, a post fast on the strap concentric with the series of cavities provided with a thread and traversing the perforation, a nut mounted on the post engaging the second face of the lens and provided with a circular series of cavities surrounding the post, a cement sleeve surrounding the post within the perforation, and cement projections upon the ends of the sleeve extending into the cavities and in the strap and the cavities in the nut.

7. In eyeglasses or spectacles, the combination of a lens provided with a perforation, a bearing for the edge of the lens, a strap on the bearing resting against the face of the lens, a post fast on the strap traversing the perforation and extending beyond the second face of the lens provided with a thread upon the projecting portion and within the area of the lens, a cement sleeve in the perforation and surrounding the post including the portion of the thread within the area of the lens, and a nut engaging the portion of the thread on the post and bearing against the face of the lens, said sleeve being stationary with relation to said lens and nut.

In testimony whereof I have affixed my signature.

FREDERICK A. STEVENS.